US012213149B2

(12) United States Patent
Tang (10) Patent No.: US 12,213,149 B2
(45) Date of Patent: *Jan. 28, 2025

(54) METHOD FOR CONFIGURING PDCCH DETECTION AND RELATED DEVICE

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 158 days.

This patent is subject to a terminal disclaimer.

(21) Appl. No.: 17/987,775

(22) Filed: Nov. 15, 2022

(65) Prior Publication Data

US 2023/0070417 A1    Mar. 9, 2023

Related U.S. Application Data

(63) Continuation of application No. 17/130,844, filed on Dec. 22, 2020, now Pat. No. 11,540,264, which is a (Continued)

(30) Foreign Application Priority Data

Jun. 29, 2018  (CN) .......................... 201810699973.7

(51) Int. Cl.
*H04W 72/23*   (2023.01)
(52) U.S. Cl.
CPC ................... *H04W 72/23* (2023.01)
(58) Field of Classification Search
CPC .................................................. H04W 72/23
See application file for complete search history.

(56) References Cited

U.S. PATENT DOCUMENTS

2010/0260124 A1   10/2010   Noshio et al.
2014/0105155 A1   4/2014    Kim et al.
(Continued)

FOREIGN PATENT DOCUMENTS

CN    102056185 A   5/2011
CN    102368871 A   7/2012
(Continued)

OTHER PUBLICATIONS

Ericsson, On Group-Common PDCCH Structure and Configuration, 3GPP TSG RAN WG1 NR Ad-Hoc#2, R1-1711483, Qingdao, P.R. China, Jun. 27-30, 2017, 4 pgs.
(Continued)

*Primary Examiner* — Ronald B Abelson
(74) *Attorney, Agent, or Firm* — Morgan, Lewis & Bockius LLP (57) ABSTRACT

Embodiments of this application provide a method for configuring physical downlink control channel (PDCCH) detection and a terminal device. The method includes: sending a first indication signal sent to a terminal device. A parameter for PDCCH detection in the first indication signal is used for the terminal device to perform PDCCH detection. The first indication signal further includes a second parameter, the second parameter being used to determine a search space to which the parameter for PDCCH detection is applicable. The second parameter includes a search space index value. The second parameter being used to determine the search space to which the parameter for PDCCH detection is applicable, includes: the parameter for PDCCH detection being corresponding to a search space corresponding to the index value.

18 Claims, 3 Drawing Sheets

Related U.S. Application Data continuation of application No. PCT/CN2019/093528, filed on Jun. 28, 2019.

(56) References Cited

U.S. PATENT DOCUMENTS

| | | | |
|---|---|---|---|
| 2014/0293924 A1 | 10/2014 | Wang et al. | |
| 2015/0029984 A1 | 1/2015 | Wang | |
| 2015/0139123 A1 | 5/2015 | McBeath et al. | |
| 2015/0334762 A1* | 11/2015 | Yang | H04W 72/20 |
| 2018/0007688 A1 | 1/2018 | Fu et al. | |
| 2018/0049175 A1 | 2/2018 | Bagheri et al. | |
| 2018/0098308 A1 | 4/2018 | Sun et al. | |
| 2019/0261332 A1 | 8/2019 | Li et al. | |
| 2020/0022119 A1* | 1/2020 | Wang | H04W 72/12 |
| 2020/0245302 A1 | 7/2020 | Pan et al. | |

FOREIGN PATENT DOCUMENTS

| | | | |
|---|---|---|---|
| CN | 102804670 | A | 11/2012 |
| CN | 103959877 | A | 7/2014 |
| CN | 104904150 | A | 9/2015 |
| CN | 105743626 | A | 7/2016 |
| CN | 106911999 | A | 6/2017 |
| CN | 108024340 | A | 5/2018 |
| EP | 2438703 | A1 | 4/2012 |
| EP | 2438703 | B1 | 10/2017 |
| EP | 3531765 | A1 | 8/2019 |
| WO | WO2016/108580 | A1 | 7/2016 |
| WO | WO2017193377 | A1 | 11/2017 |
| WO | WO2018/074071 | A1 | 4/2018 |
| WO | WO2020001582 | A1 | 1/2020 |

OTHER PUBLICATIONS

Guangdong OPPO Mobile Telecommunications Corp. Ltd., International Search Report and Written Opinion, PCT/CN2019/093528, Sep. 2, 2019, 12 pgs.

Guangdong OPPO Mobile Telecommunications Corp. Ltd., Extended European Search Report, EP19827433.4, Jul. 8, 2021, 9 pgs.

Guangdong OPPO Mobile Telecommunications Corp. Ltd., Communication Pursuant to Article 94(3), EP19827433.4, May 4, 2022, 4 pgs.

Guangdong OPPO Mobile Telecommunications Corp. Ltd., Request for CNIPA Patent Priority Review, CN202011412778.5, Jan. 29, 2022, 4 pgs.

Guangdong OPPO Mobile Telecommunications Corp. Ltd., First Office Action, CN202011412778.5, Apr. 13, 2022, 21 pgs.

Guangdong OPPO Mobile Telecommunications Corp. Ltd., Examination Report, IN202017056757, Jan. 3, 2022, 6 pgs.

InterDigital Communications, "On NR-PDCCH Design," 3GPP TSG RAN WG1 #88 Meeting, R1-1702334, Athens, Greece, Feb. 13-17, 2017, 6 pgs.

Tang, Office Action, U.S. Appl. No. 17/130,844, Apr. 1, 2022, 10 pgs.

Tang, Final Office Action, U.S. Appl. No. 17/130,844, Jul. 8, 2022, 13 pgs.

Guangdong OPPO Mobile Telecommunications Corp. Ltd., Communication Pursuant to Article 94(3), EP19827433.4, Nov. 2, 2022, 5 pgs.

OPPO Guangdong Mobile Communications Co. Ltd., Second Office Action, CN202011412778.5, Jul. 13, 2022, 12pgs.

Guangdong OPPO Mobile Telecommunications Corp. Ltd., First Office Action, SG11202013089P, Aug. 23, 2022, 13pgs.

Guangdong OPPO Mobile Telecommunications Corp. Ltd., EP19827433.4, Fourth Office Action, Aug. 29, 2022, 4 pgs.

Guangdong OPPO Mobile Telecommunications Corp. Ltd., EP19827433.4, Third Office Action, May 31, 2023, 2 pgs.

Guangdong OPPO Mobile Telecommunications Corp. Ltd., SG11202013089P, Decision of Rejection, Apr. 26, 2023, 15 pgs.

Guangdong OPPO Mobile Telecommunications Corp. Ltd., IN202017056757, Hearing Notice, Feb. 27, 2024, 2 pgs.

* cited by examiner

METHOD FOR CONFIGURING PDCCH DETECTION AND RELATED DEVICE

CROSS-REFERENCE TO RELATED APPLICATIONS

This application is a continuation application of U.S. application Ser. No. 17/130,844, entitled "METHOD FOR CONFIGURING PDCCH DETECTION AND RELATED DEVICE", filed on Dec. 22, 2020, which is a continuation application of PCT Patent Application No. PCT/CN2019/093528, entitled "METHOD FOR CONFIGURING PDCCH DETECTION AND RELATED DEVICE" filed on Jun. 28, 2019, which claims priority to Chinese Patent Application No. 201810699973.7, filed with the State Intellectual Property Office of the People's Republic of China on Jun. 29, 2018, and entitled "METHOD FOR CONFIGURING PDCCH DETECTION AND RELATED DEVICE", all of which are incorporated herein by reference in their entirety.

TECHNICAL FIELD

Embodiments of the present disclosure generally relate to information processing technologies, and more particularly, to a method for configuring Physical Downlink Control Channel (PDCCH) detection, a terminal device, a network device, a chip, a computer-readable storage medium, a computer program product and a computer program.

BACKGROUND

The research and standardization of the fifth-generation mobile communication technology (5G, 5th-Generation Wireless Systems) enable wireless broadband mobile communications to have higher peak rate, larger transmission bandwidth, and lower transmission delay. For example, the working bandwidth of a 5G terminal is on the order of 100 MHz to hundreds of megahertz (Mega Hertz, MHz), the data transmission rate is in megabits (Gbps), and the transmission delay is reduced to millisecond (ms) level. For the terminal, some problems in implementation and usage occur. For example, broadband terminal radio frequency and extremely fast baseband processing cause the power consumption of the terminal to increase compared with the previous wireless communication systems. This will affect the standby time and use time of the 5G terminal and even the battery life of the terminal.

When the terminal is in the Radio Resource Control (RRC) connected state, a large amount of power consumption is wasted. For example, in the connected state, the terminal needs to continuously monitor the PDCCH based on the configuration of the PDCCH monitoring window, but there are only a small number of PDCCH transmission slots that the network initiates scheduling to the terminal. Therefore, how to optimize the PDCCH monitoring for the terminal to reduce the power waste of the terminal during receiving of the PDCCH is a worthwhile direction for reducing the power consumption of the terminal.

SUMMARY

In order to address the above technical problems, embodiments of the present disclosure provide a method for configuring PDCCH detection, a terminal device, a network device, a chip, a computer-readable storage medium, a computer program product and a computer program, so as to reduce the power waste at the terminal side when the terminal receive the PDCCH.

According to a first aspect, there is provided a method for configuring PDCCH detection, the method being applied to a network device and including:
configuring a parameter for PDCCH detection for a terminal device by an indication signal.

According to a second aspect, there is provided a method for configuring Physical Downlink Control Channel (PDCCH) detection, the method being applied to a terminal device and including:
receiving an indication signal sent from a network side, and obtaining a parameter for PDCCH detection based on the indication signal; and
detecting a PDCCH based on the parameter for PDCCH detection.

According to a third aspect, there is provided a network device, including:
a first communication unit configured to configure a parameter for PDCCH detection for a terminal device by an indication signal.

According to a fourth aspect, there is provided a terminal device, including:
a second communication unit configured to receive an indication signal sent from a network side, and obtaining a parameter for PDCCH detection based on the indication signal; and detect a PDCCH based on the parameter for PDCCH detection.

According to a fifth aspect, there is provided a network device, including:
a processor; and
a memory for storing computer programs that run on the processor,
wherein the memory is configured to store computer programs, and the processor is configured call and run the computer programs stored in the memory to perform steps of the method according to the first aspect or any exemplary embodiments of the first aspect.

According to a sixth aspect, there is provided a terminal device, including:
a processor; and
a memory for storing computer programs that run on the processor,
wherein the memory is configured to store computer programs, and the processor is configured call and run the computer programs stored in the memory to perform steps of the method according to the second aspect or any exemplary embodiments of the second aspect.

According to a seventh aspect, there is provided a chip configured to perform the method according to the first or second aspect or any exemplary embodiments of the first second aspect.

The chip includes a processor configured to call and run computer programs from a memory, so that a device installed with the chip performs the method according to the first or second aspect or any exemplary embodiments of the first second aspect.

According to an eighth aspect, there is provided a computer-readable storage medium for storing computer programs that enable a computer to perform the method according to the first or second aspect or any exemplary embodiments of the first second aspect.

According to a ninth aspect, there is provided a computer program product including computer program instructions that cause a computer to perform the method according to the first or second aspect or any exemplary embodiments of the first second aspect.

According to a tenth aspect, there is provided a computer program. When the computer program runs on a computer, the computer is caused to perform the method according to the first or second aspect or any exemplary embodiments of the first second aspect.

The technical solutions according to embodiments of the present disclosure can control the terminal device to detect only part of the search spaces, and/or detect part of the time domain and/or frequency domain positions in the search spaces, thus reducing the frequency for the terminal device to detect the search space(s). In this way, the PDCCH detection of terminal device is optimized to reduce the complexity of the detection performed by the terminal or save power consumption.

DETAILED DESCRIPTION

Technical solutions in embodiments of the present disclosure will be described below with reference to drawings. Obviously, some exemplary embodiments but not all of the embodiments of the present disclosure are disclosed herein. Based on the described embodiments, all other embodiments obtained by those of ordinary skill in the art without creative work shall fall within the protection scope of the present disclosure.

Technical solutions according to embodiments of the present disclosure can be applied to various communication systems, such as, Global System of Mobile Communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or 5G system, etc.

Figure 1:
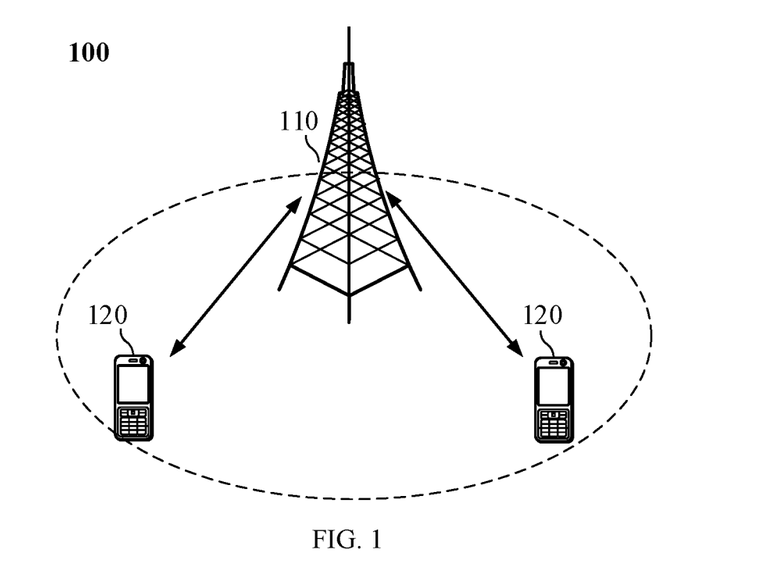
FIG. 1 is a schematic diagram of communication system architecture according to an embodiment of the present disclosure.

Exemplarily, FIG. 1 shows the communication system 100 applied in embodiments of the present disclosure. The communication system 100 may include a network device 110, and the network device 110 may be a device that communicates with a terminal device 120 (or called a communication terminal or a terminal). The network device 110 may provide communication coverage for a specific geographic area, and may communicate with terminal devices in the coverage area. According to embodiments, the network device 110 may be a base station (Base Transceiver Station, BTS) in a GSM system or a CDMA system, or a base station (NodeB, NB) in a WCDMA system, or an evolved base station (Evolutional Node B, eNB or eNodeB) in an LTE system, or a wireless controller in the Cloud Radio Access Network (CRAN), or the network device can be a mobile switching center, a relay station, an access point, vehicle-mounted equipment, a wearable device, a hub, a switch, a bridge, a router, a network side device in 5G networks, or a network device in a future evolved Public Land Mobile Network (PLMN), etc.

The communication system 100 further includes at least one terminal device 120 within the coverage area of the network device 110. As used herein, "terminal device" includes, but is not limited to, a device configured to receive/receive communication signals via wired lines, such as via Public Switched Telephone Networks (PSTN), Digital Subscriber Line (DSL), digital cables, or direct cable connections, and/or via another data connection/network; and/or via a wireless interface, such as wireless interface for cellular networks, wireless local area networks (WLAN), digital TV networks such as DVB-H networks, satellite networks, AM-FM broadcast transmitter; and/or via another terminal device; and/or "terminal device" may include, but is not limited to, an Internet of Things (IoT) device. A terminal device configured to communicate through a wireless interface may be referred to as a "wireless communication terminal", a "wireless terminal" or a "mobile terminal". Examples of mobile terminals include, but are not limited to, satellite or cellular phones; Personal Communications System (PCS) terminals that have cellular radio phone and data processing, fax, and data communication capabilities; PDA that include radio phones, pagers, Internet/intranet access, Web browser, memo pad, calendar, and/or Global Positioning System (GPS) receiver; and conventional laptop and/or palmtop receivers or other electronic device including wireless telephone transceivers. The terminal device can refer to access terminal, user equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to wireless modem, an in-vehicle device, a wearable device, a terminal device in 5G networks, or a terminal device in the future evolved PLMN, etc.

According to embodiments, Device to Device (D2D) communication may be performed between terminal devices 120.

According to embodiments, the 5G system or 5G network may also be referred to as a New Radio (NR) system or NR network.

FIG. 1 exemplarily shows one network device and two terminal devices. According to other embodiments, the communication system 100 may include multiple network devices and any number of terminal devices may be included within the coverage of each network device, and embodiments of the present disclosure do not impose specific limitations on this.

According to embodiments, the communication system 100 may also include other network entities such as a network controller and a mobility management entity, and embodiments of the present disclosure do not impose specific limitations on this.

It should be understood that devices with communication functions in the network/system in embodiments of the present disclosure may be referred to as communication devices. Taking the communication system 100 shown in FIG. 1 as an example, the communication devices may include a network device 110 and terminal devices 120 having a communication function. The network device 110 and the terminal device 120 may be the specific devices described above, which will not be repeated here. The communication devices may also include other devices in the communication system 100, such as network controllers, mobility management entities, and other network entities, and embodiments of the present disclosure do not impose specific limitations on this.

It should be understood that the terms "system" and "network" are often used interchangeably herein. The term "and/or" used herein describes an association relationship between associated objects, which means that there can be three kinds of relationships, for example, A and/or B can mean: A exists alone, A and B exist at the same time, B exists alone. In addition, the character "/" generally indicates that the related objects are in an "or" relationship.

An embodiment of the present disclosure provides a method for configuring PDCCH detection. The method is applied to a network device and includes:

configuring a parameter for PDCCH detection for a terminal device by an indication signal.

The parameter for PDCCH detection is used to indicate that the terminal device detects a specific part of the entire search spaces, and/or to indicate that the terminal device detects part of time domain and/or part of frequency domain in the search spaces.

Figure 2:
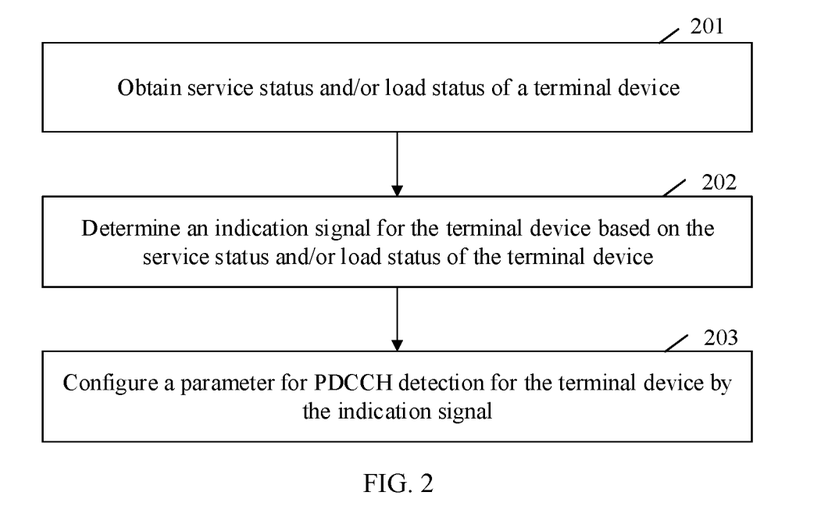
FIG. 2 is a schematic flowchart of a method for configuring PDCCH detection according to an embodiment of the present disclosure.

FIG. 2 shows a PDCCH detection method according to an embodiment of the present disclosure. The method may include:

In step 201, service status and/or load status of a terminal device are obtained.

In step 202, an indication signal for the terminal device is determined based on the service status and/or load status of the terminal device.

In step 203, a parameter for PDCCH detection is configured for the terminal device by the indication signal.

The parameter for PDCCH detection is used to indicate that the terminal device detects a specific part of the entire search spaces, and/or to indicate that the terminal device detects part of time domain and/or part of frequency domain in the search spaces.

The following describes the different types of indication signals.

First Kind of Indication Signal

A first indication signal is sent to the terminal device. The first indication signal includes a first parameter for the PDCCH detection. The first parameter is a multiple of a search space detection period.

The first indication signal further includes a second parameter. The second parameter is used to indicate an index value corresponding to the specific part of search spaces which the terminal device detects.

The detection period is a parameter for configuring a search space, and is used to indicate the period of search space detection, that is, the search space is detected once every X time slots.

According to embodiments, the first parameter P may be carried in the first indication signal. The first parameter P represents a multiple of the search space detection period. Typically, P is an integer greater than or equal to one. For example, the detection period of a certain search space of the terminal is 5 time slots, the first parameter P=4 is carried in the first indication time signal, and this indicates that the detection period of the search space is adjusted to 5*4=20 slots. It should be pointed out that the first parameter P can be understood as an adjustment factor of the detection period, and specific value of the first parameter P can be greater than one or less than one.

According to embodiments, the first indication signal further includes a second parameter; the second parameter is used to determine a search space to which the first parameter is applicable.

The second parameter includes a search space index value.

The second parameter being used to determine the search space to which the first parameter is applicable includes: the second parameter being applicable to a search space corresponding to the index value.

The first indication signal can also carry the second parameter, that is, the index of a search space (or a bitmap, each bit corresponds to a search space). In this case, the first parameter P is applied to the search space corresponding to the index. The indication to the search space is added. In other words, it is assumed that there are currently 4 search spaces, and the second parameter can be used to indicate to conduct search in the first and third search spaces; the detection period for each search space is adjusted in combination with the first parameter P.

The second parameter may be a bitmap, and each bit in the bitmap corresponds to a search space.

The second parameter being used to determine the search space to which the first parameter is applicable includes: the second parameter being applicable to a search space corresponding to a bit of a first value in the bitmap. The first value may be 1, that is, when a certain bit in the bitmap is set to 1, it indicates that the corresponding search space is the search space that needs to be detected.

It is assumed that the second parameter is indicated by means of a bitmap, for example, the bitmap is (1010), which can indicate that the first and third search spaces are detected. Of course, there can also be other indication methods, and embodiments of the present disclosure do not list all indication methods.

According to embodiments, the second parameter includes the type of a search space. The type of a search space can be configured by pre-configuration or network configuration. For example, a first type of search space is a user-specific search space, a second type of search space is a common search space; or, a first type of search space is a search space with a detection period of less than 10 time slots, and a second type of search space is a search space with a detection period greater than or equal to 10 time slots. The second parameter is one bit. When the bit value is 1, it means that the first parameter is applicable to the user-specific search space; when the value is 0, it means that the first parameter is applicable to the common search space. According to embodiments, when the second parameter is 11, it means that the first parameter is applicable to all search spaces.

According to embodiments, the first parameter is applied to all search spaces of the terminal device; or, the first parameter is applied to the first type of search space of the terminal device. The first type of search space can be a dedicated search space, or a common search space, or a search space on a certain carrier, or a search space on a certain BWP, or a search space with a detection period less than a certain value (for example, 10 time slots). The search space of the first type to which the first parameter is applicable may be network-configured or pre-configured. For example, the first indication signal does not carry the search space index, and the first parameter P is applied to all search spaces of the terminal; or the first parameter P is applied to all UE-specific search spaces of the terminal, and the parameters for the common search space remain unchanged.

In other words, when the first indication signal does not include the second parameter, only the first parameter can be used for detection, and the first parameter can be applied to all search spaces, or the first parameter can be applied to a dedicated search space of the terminal. Alternatively, the network side performs configurations to indicate that the terminal device only use the first parameter for detection regardless of whether the second parameter is currently received. The detection can be conducted for all search spaces, or for the dedicated search space of the terminal device.

In embodiments of the present disclosure, initial configuring of the detection period of at least one search space for the terminal device may be performed in the following manner: configuring the detection period corresponding to at least one search space for the terminal device by the first indication signal. That is, the network side not only configures at least one parameter by the first indication signal, but also configures the detection period of each search space in the initial state. For example, a second parameter Q may be carried in the first indication signal, and the second parameter Q is used to configure the detection period of one or more search spaces.

Second Kind of Indication Signal

In order to reduce the complexity of detecting the PDCCH by the terminal or to achieve the purpose of energy saving, the network may indicate, by a second indication signal, carrier information and/or BWP information of the PDCCH that the terminal needs to detect.

According to embodiments, a second indication signal is sent to the terminal device, and the second indication signal is used to indicate to the terminal device the carrier information and/or BWP information of the PDCCH that needs to be detected.

The network device may also perform the following processes: configure at least one carrier for the terminal device, configure at least one BWP on each carrier, and configure at least one search space on each BWP.

According to embodiments, the second indication signal includes: at least one carrier index, and/or at least one BWP index. For example, the network configures 2 carriers for the terminal, configures 4 BWPs on each carrier, and configures 8 search spaces on each BWP. The network can carry the carrier index and BWP index in the PDCCH to indicate the terminal to detect all search spaces configured on the BWP corresponding to the carrier.

It should be further noted that the at least one carrier index and/or at least one BWP index included in the second indication signal is the carrier information and/or BWP information of a PDCCH that the terminal device needs to detect. Alternatively, the at least one carrier index and/or at least one BWP index included in the second indication signal is the carrier information and/or BWP information of a PDCCH that the terminal device does not need to detect. That is, the carrier index (or BWP index) carried in the second indication signal is used to indicate that the terminal detects the search space on the carrier (BWP); or, the carrier index (or BWP index) carried in the second indication signal is used to indicate that the terminal detects search spaces on carriers (BWPs) other than the carrier (BWP).

Third Kind of Indication Signal

A third indication signal is sent to the terminal device; the third indication signal includes aggregation level information.

That is, the network device indicates to the terminal device a PDCCH corresponding to a specific aggregation level in the search space that needs to be detected.

That is, the third indication signal indicates the PDCCH corresponding to a certain aggregation level in the search space that the terminal needs to detect.

For example, the PDCCH in the New Radio (NR) system supports aggregation levels 1, 2, 4, 8, and 16, and the aggregation level information (for example, AL=4) is carried in the PDCCH, indicating that the terminal only needs to detect PDCCH corresponding to the aggregation level of 4 in all search spaces.

Fourth Kind of Indication Signal

A fourth indication signal is sent to the terminal device; the fourth indication signal includes control resource set information.

That is, the fourth indication signal is used to indicate that the terminal device detects the search space corresponding to a specific control resource set information.

In other words, the search space configured by the network for the terminal corresponds to a certain control resource set, and multiple search spaces can correspond to a same control resource set. By carrying the control resource set information in the fourth indication signal, the network can indicate that the terminal only detects the search space corresponding to the control resource set.

It should be pointed out that the above four kinds of indication signals can be used in combination. For example, at least one of the four kinds of indication signals can be used. Embodiments of the present disclosure do not list all combined use of the indication signals.

It should be noted that the indication signal in embodiments is PDCCH, or Media Access Control (MAC) Control Element (CE), or RRC signaling. That is, the first indication signal, the second indication signal, the third indication signal, and the fourth indication signal may all be transmitted by PDCCH, or MAC CE, or RRC signaling.

According to embodiments, when the indication signal is a PDCCH, if a specific field in Downlink Control Information (DCI) carried by the PDCCH is a second value, it is determined that the PDCCH includes the indication signal.

That is to say, when the first, second, third, and fourth indication signals are PDCCHs, they can be implemented through the existing DCI format. For example, by setting certain fields in the DCI to special values to indicate that the DCI is the first, second, third, or fourth indication signal.

Further, the network device may determine the indication signal according to service status and/or network loads and the like.

For example, when there are a relatively small amount of services for the terminal device, the detection period for the terminal device can be increased, and the detection period can be adjusted by the first parameter. As another example, when the network load is large, the number of detections for the terminal device can be reduced. The network can indicate to the terminal device the reduced number of detections by one or more of the foregoing four indication signals, which will not be described here in detail.

The technical solutions according to embodiments of the present disclosure can control the terminal device to detect only part of the search spaces, and/or detect part of the time domain and/or frequency domain positions in the search spaces, thus reducing the frequency for the terminal device to detect the search space(s). In this way, the PDCCH detection of the terminal device is optimized to reduce the complexity of the detection performed by the terminal or save power consumption.

Figure 3:
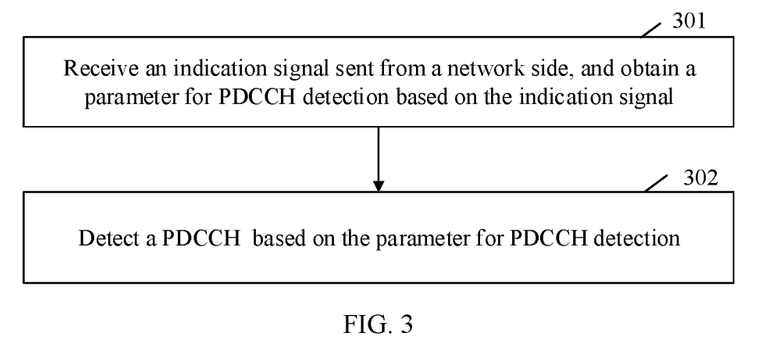
FIG. 3 is a schematic flowchart of a method for configuring PDCCH detection according to an embodiment of the present disclosure.

An embodiment of the present disclosure provides a method for configuring PDCCH detection. The method is applied to a terminal device and includes the following steps, as shown in FIG. 3:

In step 301, an indication signal sent from a network side is received, and a parameter for PDCCH detection is obtained based on the indication signal.

In step 302, a PDCCH is detected based on the parameter for PDCCH detection.

The parameter for PDCCH detection is used to indicate that the terminal device detects a specific part of the entire search spaces, and/or to indicate that the terminal device detects part of time domain and/or part of frequency domain in the search spaces.

The following describes different types of indication signals.

First Kind of Indication Signal

A first indication signal sent from the network side is received. The first indication signal includes a first parameter. The first parameter is a multiple of a search space detection period.

The first indication signal further includes a second parameter. The second parameter is used to determine a search space to which the first parameter is applicable.

According to embodiments, the first parameter P may be carried in the first indication signal. The first parameter P represents a multiple of the search space detection period. Typically, P is an integer greater than or equal to one. For example, the detection period of a certain search space of the terminal is 5 time slots, the first parameter P=4 is carried in the first indication time signal, and this indicates that the detection period of the search space is adjusted to 5*4=20 slots. It should be pointed out that the first parameter P can be understood as an adjustment factor of the detection period, and specific value of the first parameter P can be greater than one or less than one.

The second parameter includes a search space index value.

The second parameter being used to determine the search space to which the first parameter is applicable includes: the second parameter being applicable to a search space corresponding to the index value.

The first indication signal can also carry the second parameter, that is, the index of a search space (or a bitmap, each bit corresponds to a search space). In this case, the first parameter P is applied to the search space corresponding to the index. The indication to the search space is added. In other words, it is assumed that there are currently 4 search spaces, and the second parameter can be used to indicate to conduct search in the first and third search spaces; the detection period for each search space is adjusted in combination with the first parameter P.

The second parameter may be a bitmap, and each bit in the bitmap corresponds to a search space.

The second parameter being used to determine the search space to which the first parameter is applicable includes: the second parameter being applicable to a search space corresponding to a bit of a first value in the bitmap. The first value may be 1, that is, when a certain bit in the bitmap is set to 1, it indicates that the corresponding search space is the search space that needs to be detected.

It is assumed that the second parameter is indicated by means of a bitmap, for example, the bitmap is (1010), which can indicate that the first and third search spaces are detected. Of course, there can also be other indication methods, and embodiments of the present disclosure do not list all indication methods.

According to embodiments, the first parameter is applied to all search spaces of the terminal device; or, the first parameter is applied to the first type of search space of the terminal device. The first type of search space can be a dedicated search space, or a common search space, or a search space on a certain carrier, or a search space on a certain BWP. The search space of the first type to which the first parameter is applicable may be network-configured or pre-configured. For example, the first indication signal does not carry the search space index, and the first parameter P is applied to all search spaces of the terminal; or the first parameter P is applied to all UE-specific search spaces of the terminal, and the parameters for the common search space remain unchanged.

In other words, when the first indication signal does not include the second parameter, only the first parameter can be used for detection, and the first parameter can be applied to all search spaces, or the first parameter can be applied to a dedicated search space of the terminal. Alternatively, the network side performs configurations to indicate that the terminal device only use the first parameter for detection regardless of whether the second parameter is currently received. The detection can be conducted for all search spaces, or for the dedicated search space of the terminal device.

In embodiments of the present disclosure, initial configuring of the detection period of at least one search space for the terminal device may be performed in the following manner: configuring the detection period corresponding to at least one search space for the terminal device by the first indication signal. That is, the network side not only configures at least one parameter by the first indication signal, but also configures the detection period of each search space in the initial state. For example, a second parameter Q may be carried in the first indication signal, and the second parameter Q is used to configure the detection period of one or more search spaces.

Second Kind of Indication Signal

In order to reduce the complexity of detecting the PDCCH by the terminal or to achieve the purpose of energy saving, the network may indicate, by a second indication signal, carrier information and/or BWP information of the PDCCH that the terminal needs to detect.

According to embodiments, a second indication signal sent from the network side is received, and carrier information and/or BWP information of the PDCCH that needs to be detected is obtained based on the second indication signal.

The network device may also perform the following processes: configure at least one carrier for the terminal device, configure at least one BWP on each carrier, and configure at least one search space on each BWP.

According to embodiments, the second indication signal includes: at least one carrier index, and/or at least one BWP index. For example, the network configures 2 carriers for the terminal, configures 4 BWPs on each carrier, and configures 8 search spaces on each BWP. The network can carry the carrier index and BWP index in the PDCCH to indicate the terminal to detect all search spaces configured on the BWP corresponding to the carrier.

It should be further noted that the at least one carrier index and/or at least one BWP index included in the second indication signal is the carrier information and/or BWP information of a PDCCH that the terminal device needs to detect. Alternatively, the at least one carrier index and/or at least one BWP index included in the second indication signal is the carrier information and/or BWP information of a PDCCH that the terminal device does not need to detect. That is, the carrier index (or BWP index) carried in the second indication signal is used to indicate that the terminal detects the search space on the carrier (BWP); or, the carrier index (or BWP index) carried in the second indication signal is used to indicate that the terminal detects search spaces on carriers (BWPs) other than the carrier (BWP).

Third Kind of Indication Signal

A third indication signal sent from the network side is received; the third indication signal includes aggregation level information; and the PDCCH is detected based on the aggregation level information.

That is, the third indication signal indicates the PDCCH corresponding to a certain aggregation level in the search space that the terminal needs to detect.

For example, the PDCCH in the NR system supports aggregation levels 1, 2, 4, 8, and 16, and the aggregation level information (for example, AL=4) is carried in the PDCCH, indicating that the terminal only needs to detect PDCCH corresponding to the aggregation level of 4 in all search spaces.

Fourth Kind of Indication Signal

A fourth indication signal sent from the network side is received; the fourth indication signal includes control resource set information; and the PDCCH in a search space which is associated to the control resource set is detected.

In other words, the search space configured by the network for the terminal corresponds to a certain control resource set, and multiple search spaces can correspond to a same control resource set. By carrying the control resource set information in the fourth indication signal, the network can indicate that the terminal only detects the search space corresponding to the control resource set.

It should be pointed out that the above four kinds of indication signals can be used in combination. For example, at least one of the four kinds of indication signals can be used. Embodiments of the present disclosure do not list all combined use of the indication signals.

It should be noted that the indication signal in embodiments is PDCCH, or Media Access Control (MAC) Control Element (CE), or RRC signaling. That is, the first indication signal, the second indication signal, the third indication signal, and the fourth indication signal may all be transmitted by PDCCH, or MAC CE, or RRC signaling.

According to embodiments, when the indication signal is a PDCCH, if a specific field in DCI carried by the PDCCH is a second value, it is determined that the PDCCH includes the indication signal.

That is to say, when the first, second, third, and fourth indication signals are PDCCHs, they can be implemented through the existing DCI format. For example, by setting certain fields in the DCI to special values to indicate that the DCI is the first, second, third, or fourth indication signal.

Further, the network device may determine the indication signal according to service status and/or network loads and the like.

For example, when there are a relatively small amount of services for the terminal device, the detection period for the terminal device can be increased, and the detection period can be adjusted by the first parameter. As another example, when the network load is large, the number of detections for the terminal device can be reduced. The network can indicate to the terminal device the reduced number of detections by one or more of the foregoing four indication signals, which will not be described here in detail.

The technical solutions according to embodiments of the present disclosure can control the terminal device to detect only part of the search spaces, and/or detect part of the time domain and/or frequency domain positions in the search spaces, thus reducing the frequency for the terminal device to detect the search space(s). In this way, the PDCCH detection of the terminal device is optimized to reduce the complexity of the detection performed by the terminal or save power consumption.

An embodiment of the present disclosure provides a network device, including:

a first communication unit configured to configure a parameter for PDCCH detection for a terminal device by an indication signal.

The parameter for PDCCH detection is used to indicate that the terminal device detects a specific part of the entire search spaces, and/or to indicate that the terminal device detects part of time domain and/or part of frequency domain in the search spaces.

The following describes the different types of indication signals.

First Kind of Indication Signal

The first communication unit is configured to send first indication signal to the terminal device. The first indication signal includes a first parameter for the PDCCH detection. The first parameter is a multiple of a search space detection period.

The first indication signal further includes a second parameter. The second parameter is used to indicate an index value corresponding to the specific part of search spaces which the terminal device detects.

The detection period is a parameter for configuring a search space, and is used to indicate the period of search space detection, that is, the search space is detected once every X time slots.

According to embodiments, the first parameter P may be carried in the first indication signal. The first parameter P represents a multiple of the search space detection period. Typically, P is an integer greater than one. For example, the detection period of a certain search space of the terminal is 5 time slots, the first parameter P=4 is carried in the first indication time signal, and this indicates that the detection period of the search space is adjusted to 5*4=20 slots. It should be pointed out that the first parameter P can be understood as an adjustment factor of the detection period, and specific value of the first parameter P can be greater than one or less than one.

According to embodiments, the first indication signal further includes a second parameter; the second parameter is used to determine a search space to which the first parameter is applicable.

The second parameter includes a search space index value.

The second parameter being used to determine the search space to which the first parameter is applicable includes: the second parameter being applicable to a search space corresponding to the index value.

The first indication signal can also carry the second parameter, that is, the index of a search space (or a bitmap, each bit corresponds to a search space). In this case, the first parameter P is applied to the search space corresponding to the index. The indication to the search space is added. In other words, it is assumed that there are currently 4 search spaces, and the second parameter can be used to indicate to conduct search in the first and third search spaces; the detection period for each search space is adjusted in combination with the first parameter P.

The second parameter may be a bitmap, and each bit in the bitmap corresponds to a search space.

The second parameter being used to determine the search space to which the first parameter is applicable includes: the second parameter being applicable to a search space corresponding to a bit of a first value in the bitmap. The first value may be 1, that is, when a certain bit in the bitmap is set to 1, it indicates that the corresponding search space is the search space that needs to be detected.

It is assumed that the second parameter is indicated by means of a bitmap, for example, the bitmap is (1010), which can indicate that the first and third search spaces are detected. Of course, there can also be other indication methods, and embodiments of the present disclosure do not list all indication methods.

According to embodiments, the first parameter is applied to all search spaces of the terminal device; or, the first parameter is applied to the first type of search space of the terminal device. The first type of search space can be a dedicated search space, or a common search space, or a search space on a certain carrier, or a search space on a certain BWP. The search space of the first type to which the first parameter is applicable may be network-configured or pre-configured. For example, the first indication signal does not carry the search space index, and the first parameter P is applied to all search spaces of the terminal; or the first parameter P is applied to all UE-specific search spaces of the terminal, and the parameters for the common search space remain unchanged.

In other words, when the first indication signal does not include the second parameter, only the first parameter can be used for detection, and the first parameter can be applied to all search spaces, or the first parameter can be applied to a dedicated search space of the terminal. Alternatively, the network side performs configurations to indicate that the terminal device only use the first parameter for detection regardless of whether the second parameter is currently received. The detection can be conducted for all search spaces, or for the dedicated search space of the terminal device.

In embodiments of the present disclosure, initial configuring of the detection period of at least one search space for the terminal device may be performed in the following manner: configuring the detection period corresponding to at least one search space for the terminal device by the first indication signal. That is, the network side not only configures at least one parameter by the first indication signal, but also configures the detection period of each search space in the initial state. For example, a second parameter Q may be carried in the first indication signal, and the second parameter Q is used to configure the detection period of one or more search spaces.

Second Kind of Indication Signal

In order to reduce the complexity of detecting the PDCCH by the terminal or to achieve the purpose of energy saving, the network may indicate, by a second indication signal, carrier information and/or BWP information of the PDCCH that the terminal needs to detect.

According to embodiments, the first communication unit is configured to send a second indication signal to the terminal device, and the second indication signal is used to indicate to the terminal device the carrier information and/or BWP information of the PDCCH that needs to be detected.

The network device may also perform the following processes: configure at least one carrier for the terminal device, configure at least one BWP on each carrier, and configure at least one search space on each BWP.

According to embodiments, the second indication signal includes: at least one carrier index, and/or at least one BWP index. For example, the network configures 2 carriers for the terminal, configures 4 BWPs on each carrier, and configures 8 search spaces on each BWP. The network can carry the carrier index and BWP index in the PDCCH to indicate the terminal to detect all search spaces configured on the BWP corresponding to the carrier.

It should be further noted that the at least one carrier index and/or at least one BWP index included in the second indication signal is the carrier information and/or BWP information of a PDCCH that the terminal device needs to detect. Alternatively, the at least one carrier index and/or at least one BWP index included in the second indication signal is the carrier information and/or BWP information of a PDCCH that the terminal device does not need to detect. That is, the carrier index (or BWP index) carried in the second indication signal is used to indicate that the terminal detects the search space on the carrier (BWP); or, the carrier index (or BWP index) carried in the second indication signal is used to indicate that the terminal detects search spaces on carriers (BWPs) other than the carrier (BWP).

Third Kind of Indication Signal

The first communication unit is configured to send a third indication signal to the terminal device; the third indication signal includes aggregation level information.

That is, the network device indicates to the terminal device a PDCCH corresponding to a specific aggregation level in the search space that needs to be detected.

That is, the third indication signal indicates the PDCCH corresponding to a certain aggregation level in the search space that the terminal needs to detect.

For example, the PDCCH in the NR system supports aggregation levels 1, 2, 4, 8, and 16, and the aggregation level information (for example, AL=4) is carried in the PDCCH, indicating that the terminal only needs to detect PDCCH corresponding to the aggregation level of 4 in all search spaces.

Fourth Kind of Indication Signal

The first communication unit is configured to send a fourth indication signal is sent to the terminal device; the fourth indication signal includes control resource set information.

That is, the fourth indication signal is used to indicate that the terminal device detects the search space corresponding to a specific control resource set information.

In other words, the search space configured by the network for the terminal corresponds to a certain control resource set, and multiple search spaces can correspond to a same control resource set. By carrying the control resource set information in the fourth indication signal, the network can indicate that the terminal only detects the search space corresponding to the control resource set.

It should be pointed out that the above four kinds of indication signals can be used in combination. For example, at least one of the four kinds of indication signals can be used. Embodiments of the present disclosure do not list all combined use of the indication signals.

It should be noted that the indication signal in embodiments is PDCCH, or MAC CE, or RRC signaling. That is, the first indication signal, the second indication signal, the third indication signal, and the fourth indication signal may all be transmitted by PDCCH, or MAC CE, or RRC signaling.

According to embodiments, when the indication signal is a PDCCH, if a specific field in DCI carried by the PDCCH is a second value, it is determined that the PDCCH includes the indication signal.

That is to say, when the first, second, third, and fourth indication signals are PDCCHs, they can be implemented through the existing DCI format. For example, by setting certain fields in the DCI to special values to indicate that the DCI is the first, second, third, or fourth indication signal.

Further, the network device may determine the indication signal according to service status and/or network loads and the like.

For example, when there are a relatively small amount of services for the terminal device, the detection period for the terminal device can be increased, and the detection period can be adjusted by the first parameter. As another example, when the network load is large, the number of detections for the terminal device can be reduced. The network can indicate to the terminal device the reduced number of detections by one or more of the foregoing four indication signals, which will not be described here in detail.

The technical solutions according to embodiments of the present disclosure can control the terminal device to detect only part of the search spaces, and/or detect part of the time domain and/or frequency domain positions in the search spaces, thus reducing the frequency for the terminal device to detect the search space(s). In this way, the PDCCH detection of the terminal device is optimized to reduce the complexity of the detection performed by the terminal or save power consumption.

Figure 4:
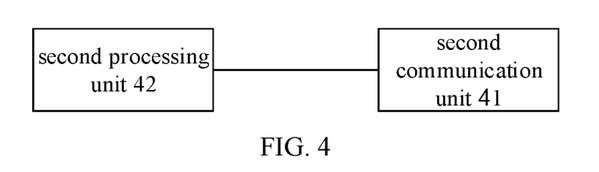
FIG. 4 is a schematic diagram showing structure of a terminal device according to an embodiment of the present disclosure.

An embodiment of the present disclosure provides a terminal device. As shown in FIG. 4, the terminal device includes a second communication unit 41.

The second communication unit 41 is configured to:
receive an indication signal sent from a network side, and obtain a parameter for PDCCH detection is obtained based on the indication signal; and
detect a PDCCH based on the parameter for PDCCH detection.

The parameter for PDCCH detection is used to indicate that the terminal device detects a specific part of the entire search spaces, and/or to indicate that the terminal device detects part of time domain and/or part of frequency domain in the search spaces.

The following describes different types of indication signals.

First Kind of Indication Signal

The second communication unit 41 is configured to receive a first indication signal sent from the network side. The first indication signal includes a first parameter. The first parameter is a multiple of a search space detection period.

The detection period is a parameter for configuring a search space, and is used to indicate the period of search space detection, that is, the search space is detected once every X time slots.

According to embodiments, the first parameter P may be carried in the first indication signal. The first parameter P represents a multiple of the search space detection period. Typically, P is an integer greater than or equal to one. For example, the detection period of a certain search space of the terminal is 5 time slots, the first parameter P=4 is carried in the first indication time signal, and this indicates that the detection period of the search space is adjusted to 5*4=20 slots. It should be pointed out that the first parameter P can be understood as an adjustment factor of the detection period, and specific value of the first parameter P can be greater than one or less than one.

According to embodiments, the first indication signal includes a second parameter. The second parameter is used to determine a search space to which the first parameter is applicable.

The second parameter includes a search space index value.

The second parameter is applicable to a search space corresponding to the index value.

The first indication signal can also carry the second parameter, that is, the index of a search space (or a bitmap, each bit corresponds to a search space). In this case, the first parameter P is applied to the search space corresponding to the index. The indication to the search space is added. In other words, it is assumed that there are currently 4 search spaces, and the second parameter can be used to indicate to conduct search in the first and third search spaces; the detection period for each search space is adjusted in combination with the first parameter P.

The second parameter may be a bitmap, and each bit in the bitmap corresponds to a search space.

The second parameter being used to determine the search space to which the first parameter is applicable includes: the second parameter being applicable to a search space corresponding to a bit of a first value in the bitmap. The first value may be 1, that is, when a certain bit in the bitmap is set to 1, it indicates that the corresponding search space is the search space that needs to be detected.

It is assumed that the second parameter is indicated by means of a bitmap, for example, the bitmap is (1010), which can indicate that the first and third search spaces are detected. Of course, there can also be other indication methods, and embodiments of the present disclosure do not list all indication methods.

According to embodiments, the first parameter is applied to all search spaces of the terminal device; or, the first parameter is applied to the first type of search space of the terminal device. The first type of search space can be a dedicated search space, or a common search space, or a search space on a certain carrier, or a search space on a certain BWP. The search space of the first type to which the first parameter is applicable may be network-configured or pre-configured. For example, the first indication signal does not carry the search space index, and the first parameter P is applied to all search spaces of the terminal; or the first parameter P is applied to all UE-specific search spaces of the terminal, and the parameters for the common search space remain unchanged.

In other words, when the first indication signal does not include the second parameter, only the first parameter can be used for detection, and the first parameter can be applied to all search spaces, or the first parameter can be applied to a dedicated search space of the terminal. Alternatively, the network side performs configurations to indicate that the terminal device only use the first parameter for detection regardless of whether the second parameter is currently received. The detection can be conducted for all search spaces, or for the dedicated search space of the terminal device.

In embodiments of the present disclosure, initial configuring of the detection period of at least one search space for the terminal device may be performed in the following manner: configuring the detection period corresponding to at least one search space for the terminal device by the first indication signal. That is, the network side not only configures at least one parameter by the first indication signal, but also configures the detection period of each search space in the initial state. For example, a second parameter Q may be carried in the first indication signal, and the second parameter Q is used to configure the detection period of one or more search spaces.

Second Kind of Indication Signal

In order to reduce the complexity of detecting the PDCCH by the terminal or to achieve the purpose of energy saving, the network may indicate, by a second indication signal, carrier information and/or BWP information of the PDCCH that the terminal needs to detect.

According to embodiments, the second communication unit 41 is configured to receive a second indication signal sent from the network side, and obtain carrier information and/or BWP information of the PDCCH that needs to be detected based on the second indication signal.

The network device may also perform the following processes: configure at least one carrier for the terminal device, configure at least one BWP on each carrier, and configure at least one search space on each BWP.

According to embodiments, the second indication signal includes: at least one carrier index, and/or at least one BWP index. For example, the network configures 2 carriers for the terminal, configures 4 BWPs on each carrier, and configures 8 search spaces on each BWP. The network can carry the carrier index and BWP index in the PDCCH to indicate the terminal to detect all search spaces configured on the BWP corresponding to the carrier.

It should be further noted that the at least one carrier index and/or at least one BWP index included in the second indication signal is the carrier information and/or BWP information of a PDCCH that the terminal device needs to detect. Alternatively, the at least one carrier index and/or at least one BWP index included in the second indication signal is the carrier information and/or BWP information of a PDCCH that the terminal device does not need to detect. That is, the carrier index (or BWP index) carried in the second indication signal is used to indicate that the terminal detects the search space on the carrier (BWP); or, the carrier index (or BWP index) carried in the second indication signal is used to indicate that the terminal detects search spaces on carriers (BWPs) other than the carrier (BWP).

Third Kind of Indication Signal

The second communication unit 41 is configured to: receive a third indication signal sent from the network side, the third indication signal including aggregation level information; and detect the PDCCH based on the aggregation level information.

That is, the third indication signal indicates the PDCCH corresponding to a certain aggregation level in the search space that the terminal needs to detect.

For example, the PDCCH in the NR system supports aggregation levels 1, 2, 4, 8, and 16, and the aggregation level information (for example, AL=4) is carried in the PDCCH, indicating that the terminal only needs to detect PDCCH corresponding to the aggregation level of 4 in all search spaces.

Fourth Kind of Indication Signal

The second communication unit 41 is configured to: receive a fourth indication signal sent from the network side, the fourth indication signal including control resource set information; and detect the PDCCH in a search space which is associated to the control resource set.

In other words, the search space configured by the network for the terminal corresponds to a certain control resource set, and multiple search spaces can correspond to a same control resource set. By carrying the control resource set information in the fourth indication signal, the network can indicate that the terminal only detects the search space corresponding to the control resource set.

It should be pointed out that the above four kinds of indication signals can be used in combination. For example, at least one of the four kinds of indication signals can be used. Embodiments of the present disclosure do not list all combined use of the indication signals.

It should be noted that the indication signal in embodiments is PDCCH, or Media Access Control (MAC) Control Element (CE), or RRC signaling. That is, the first indication signal, the second indication signal, the third indication signal, and the fourth indication signal may all be transmitted by PDCCH, or MAC CE, or RRC signaling.

According to embodiments, a second processing unit 42 is configured to, when the indication signal is a PDCCH, if a specific field in DCI carried by the PDCCH is a second value, determine that the PDCCH includes the indication signal.

That is to say, when the first, second, third, and fourth indication signals are PDCCHs, they can be implemented through the existing DCI format. For example, by setting certain fields in the DCI to special values to indicate that the DCI is the first, second, third, or fourth indication signal.

Further, the network device may determine the indication signal according to service status and/or network loads and the like.

For example, when there are a relatively small amount of services for the terminal device, the detection period for the terminal device can be increased, and the detection period can be adjusted by the first parameter. As another example, when the network load is large, the number of detections for the terminal device can be reduced. The network can indicate to the terminal device the reduced number of detections by one or more of the foregoing four indication signals, which will not be described here in detail.

The technical solutions according to embodiments of the present disclosure can control the terminal device to detect only part of the search spaces, and/or detect part of the time domain and/or frequency domain positions in the search spaces, thus reducing the frequency for the terminal device to detect the search space(s). In this way, the PDCCH detection of the terminal device is optimized to reduce the complexity of the detection performed by the terminal or save power consumption.

Figure 5:
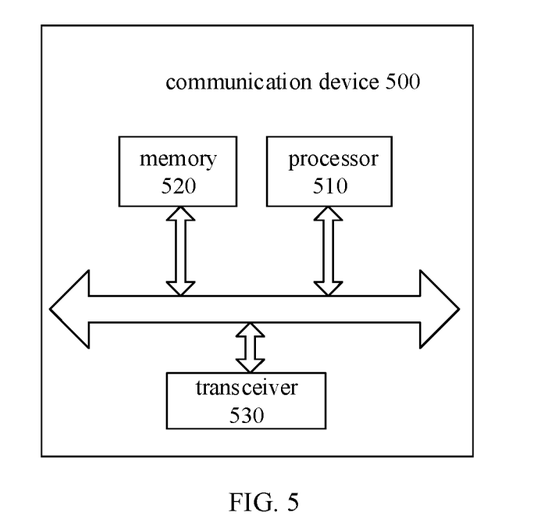
FIG. 5 is a schematic diagram showing structure of a communication device according to an embodiment of the present disclosure.

FIG. 5 is a schematic structural diagram of a communication device 500 according to an embodiment of the present disclosure. The communication device 500 shown in FIG. 5 includes a processor 510. The processor 510 can call and run a computer program from a memory to implement the methods in the embodiments of the present disclosure.

According to embodiments, as shown in FIG. 5, the communication device 500 may further include a memory 520. The processor 510 may call and run a computer program from the memory 520 to implement the methods in the embodiment of the present disclosure.

The memory 520 may be a separate device independent of the processor 510, or may be integrated in the processor 510.

According to embodiments, as shown in FIG. 5, the communication device 500 may further include a transceiver 530. The processor 510 may control the transceiver 530 to communicate with other devices. Specifically, the transceiver 530 may send information or data to other devices, or receive information or data sent from other devices.

The transceiver 530 may include a transmitter and a receiver. The transceiver 530 may further include one or more antennas.

According to embodiments, the communication device 500 may be the network device in embodiments of the present disclosure, and the communication device 500 may implement the corresponding processes implemented by the network device in the methods according to embodiments of the present disclosure. For brevity, repeated descriptions are omitted here.

According to embodiments, the communication device 500 may be the terminal device in embodiments of the present disclosure, and the communication device 500 may implement the corresponding processes implemented by the mobile terminal/terminal device in the methods according to embodiments of the present disclosure. For brevity, repeated descriptions are omitted here.

Figure 6:
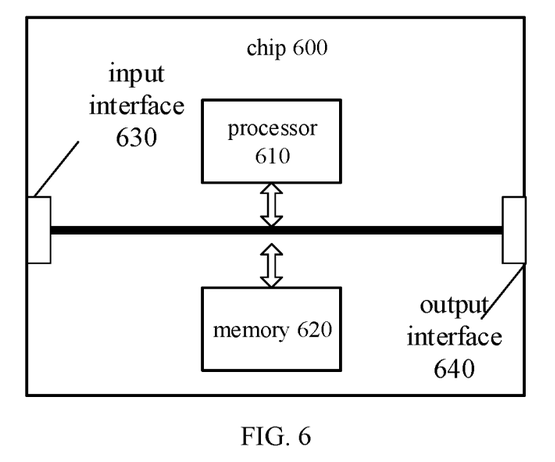
FIG. 6 is a schematic block diagram of a chip according to an embodiment of the present disclosure.

FIG. 6 is a schematic structural diagram of a chip according to an embodiment of the present disclosure. The chip 600 shown in FIG. 6 includes a processor 610. The processor 610 can call and run a computer program from a memory to implement the methods in the embodiments of the present disclosure.

According to embodiments, as shown in FIG. 6, the chip 600 may further include a memory 620. The processor 610 may call and run a computer program from the memory 620 to implement the methods in the embodiment of the present disclosure.

The memory 620 may be a separate device independent of the processor 610, or may be integrated in the processor 610.

According to embodiments, the chip 600 may further include an input interface 630. The processor 610 may control the input interface 630 to communicate with other devices or chips. Specifically, input interface 630 may obtain information or data sent from other devices or chips.

According to embodiments, the chip 600 may further include an output interface 640. The processor 610 may control the output interface 640 to communicate with other devices or chips. Specifically, output interface 640 may output information or data to other devices or chips.

According to embodiments, the chip may be the network device in embodiments of the present disclosure, and the chip may implement the corresponding processes implemented by the network device in the methods according to embodiments of the present disclosure. For brevity, repeated descriptions are omitted here.

According to embodiments, the chip may be the terminal device in embodiments of the present disclosure, and the chip may implement the corresponding processes implemented by the terminal device in the methods according to embodiments of the present disclosure. For brevity, repeated descriptions are omitted here.

It should be understood that the chip mentioned in embodiments of the present application may also be referred to as a system-level chip, a system chip, a chip system, or a system-on-chip.

Figure 7:
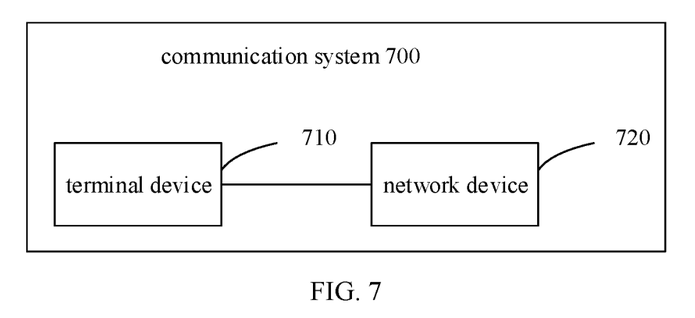
FIG. 7 is a schematic diagram of communication system architecture according to an embodiment of the present disclosure.

FIG. 7 is a schematic block diagram of a communication system 700 according to an embodiment of the present disclosure. As shown in FIG. 7, the communication system 700 includes a terminal device 710 and a network device 720.

The terminal device 710 can be used to implement the corresponding functions implemented by the terminal device in the above methods, and the network device 720 can be used to implement the corresponding functions implemented by the network device in the above methods. For brevity, repeated descriptions are omitted here.

It should be understood that the processors in embodiments of the present disclosure may be an integrated circuit chip which has signal processing capability. During implementation, each step of the foregoing method implementations can be completed by an integrated hardware logic circuit in the processors or software instructions. Each of the above-described processors can be a general-purpose processor, a Digital Signal Processors (DSPs), an Application Specific Integrated Circuit (ASIC), a Field Programmable Gate Array (FPGA) or other programmable logic devices, discrete gates or transistor logic devices, discrete hardware components, which can implement or perform the methods, steps, and logical block diagrams disclosed in the implementations of the present disclosure. The general-purpose processor can be a microprocessor or any conventional processor. The steps of the methods disclosed in the implementations of the present disclosure can be directly completed by a hardware decoding processor, or by a combination of hardware and software modules in the decoding processor. The software modules can be located in a storage medium that is well-known in the art such as a random access memory, a flash memory, a read only memory, a programmable read only memory or an electrically erasable programmable memory, a register. The storage medium is located in the memory and the processor reads information in the memory and completes the steps of the above-described methods with its hardware.

It can be understood that the memory in the implementations of the present disclosure can be a volatile memory or a non-volatile memory, or can include both volatile memory and non-volatile memory. The non-volatile memory can be a Read-Only Memory (ROM), a Programmable ROM (PROM), an Erasable PROM (EPROM), an Electrically EPROM (EEPROM) or a flash memory. The volatile memory can be a Random Access Memory (RAM) that serves as an external cache. By exemplary rather than limiting way, many forms of RAMs can be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories in the systems and methods described herein are intended to include, but not limited to, these and any other suitable types of memories.

It should be understood that the foregoing memory is exemplary but not restrictive. For example, the memory in embodiments of the present disclosure may also be Static Random Access Memory (SRAM), Dynamic Random Access Memory (DRAM), synchronous DRAM (SDRAM), Double Data Rate SDRAM (DDR SDRAM), Enhanced SDRAM (ESDRAM), Synch Link DRAM (SLDRAM), or Direct Rambus RAM (DR RAM), etc. That is to say, the memory in embodiments of the present disclosure is intended to include but not limited to these and any other suitable types of memories.

An embodiment of the present disclosure also provides a computer-readable storage medium for storing computer programs.

According to embodiments, the computer-readable storage medium may be applied to the network device in embodiments of the present disclosure, and the computer programs cause the computer to perform corresponding processes implemented by the network device in the methods according to embodiments of the present disclosure. For brevity, repeated descriptions are omitted here.

According to embodiments, the computer-readable storage medium may be applied to the terminal device in embodiments of the present disclosure, and the computer programs cause the computer to perform corresponding processes implemented by the terminal device in the methods according to embodiments of the present disclosure. For brevity, repeated descriptions are omitted here.

An embodiment of the present application also provides a computer program product, including computer program instructions.

According to embodiments, the computer program product can be applied to the network device in embodiments of the present disclosure, and the computer program instructions cause the computer to perform corresponding processes implemented by the network device in the methods according to embodiments of the present disclosure. For brevity, repeated descriptions are omitted here.

According to embodiments, the computer program product can be applied to the mobile terminal/terminal device in embodiments of the present disclosure, and the computer program instructions cause the computer to perform corresponding processes implemented by the mobile terminal/terminal device in the methods according to embodiments of the present disclosure. For brevity, repeated descriptions are omitted here.

An embodiment of the present disclosure also provides a computer program.

According to embodiments, the computer program can be applied to the network device in embodiments of the present disclosure. When the computer program is run on the computer, the computer is caused to perform corresponding processes implemented by the network device in the methods according to embodiments of the present disclosure. For brevity, repeated descriptions are omitted here.

According to embodiments, the computer program can be applied to the mobile terminal/terminal device in embodiments of the present disclosure. When the computer program is run on the computer, the computer is caused to perform corresponding processes implemented by the mobile terminal/terminal device in the methods according to embodiments of the present disclosure. For brevity, repeated descriptions are omitted here.

It should be pointed out that various embodiments provided by the present disclosure can be used in combination, or used alone, or at least one of the embodiments can be used, and details are not provided here.

Those of ordinary skill in the art will appreciate that the exemplary units and algorithm steps described according to the embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method implementations.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the implementations.

In addition, the functional units in the implementations of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the implementations of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary implementations of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for configuring Physical Downlink Control Channel (PDCCH) detection, the method being applied to a network device and comprising:
    sending a first indication signal to a terminal device, wherein a parameter for PDCCH detection in the first indication signal is used for the terminal device to perform PDCCH detection;
    wherein the first indication signal further comprises a second parameter, the second parameter being used to determine a search space to which the parameter for PDCCH detection is applicable;
    wherein the second parameter comprises a search space index value;
    wherein the second parameter being used to determine the search space to which the parameter for PDCCH detection is applicable, comprises:
    the parameter for PDCCH detection being corresponding to a search space corresponding to the index value.

2. The method according to claim 1, wherein the parameter for PDCCH detection is used to indicate that the terminal device detects a specific part of search spaces among all search spaces.

3. The method according to claim 1, wherein the first indication signal comprises the parameter for PDCCH detection, and the parameter for PDCCH detection corresponds to a first type search space of the terminal device.

4. The method according to claim 1, wherein a type of the search space is configured by the network device.

5. The method according to claim 1, further comprising:
sending a second indication signal to the terminal device, wherein the second indication signal is used to indicate to the terminal device at least one of carrier information or BandWidth Part (BWP) information of the PDCCH that needs to be detected.

6. The method according to claim 5, wherein the second indication signal comprises at least one of: at least one carrier index, or at least one BWP index.

7. The method according to claim 6, wherein the at least one of at least one carrier index or at least one BWP index comprised in the second indication signal is at least one of carrier information or BWP information of the PDCCH that the terminal device needs to detect.

8. The method according to claim 1, further comprising:
sending a third indication signal to the terminal device, wherein the third indication signal comprises aggregation level information and is used for the terminal device to detect PDCCH according to the aggregation level information based on the aggregation level information.

9. The method according to claim 1, wherein the first indication signal is PDCCH.

10. A network device, comprising a processor, a transceiver, and a memory for storing instructions that, when executed by the processor, cause the processor to:
control the transceiver to send a first indication signal to a terminal device, wherein a parameter for Physical Downlink Control Channel (PDCCH) detection in the first indication signal is used for the terminal device to perform PDCCH detection;
wherein the first indication signal further comprises a second parameter; the second parameter being used to determine a search space to which the parameter for PDCCH detection is applicable;
wherein the second parameter comprises a search space index value;
wherein the parameter for PDCCH detection corresponds to a search space corresponding to the index value.

11. The network device according to claim 10, wherein the parameter for PDCCH detection is used to indicate that the terminal device detects a specific part of search spaces among all search spaces.

12. The network device according to claim 10, wherein the first indication signal comprises the parameter for PDCCH detection, and the parameter for PDCCH detection corresponds to a first type search space of the terminal device.

13. The network device according to claim 10, wherein a type of the search space is configured by the network device.

14. The network device according to claim 10, wherein to the processor is configured to control the transceiver to send a second indication signal to the terminal device, wherein the second indication signal is used to indicate to the terminal device at least one of carrier information or BWP information of the PDCCH that needs to be detected.

15. The network device according to claim 14, wherein the second indication signal comprises at least one of: at least one carrier index, or at least one BWP index.

16. The network device according to claim 15, wherein the at least one of at least one carrier index or at least one BWP index comprised in the second indication signal is at least one of carrier information or BWP information of the PDCCH that the terminal device needs to detect.

17. The network device according to claim 10, wherein the processor is configured to control the transceiver to:
send a third indication signal to the terminal device, wherein the third indication signal comprises aggregation level information and is used for the terminal device to detect PDCCH according to the aggregation level information.

18. The network device according to claim 10, wherein the first indication signal is PDCCH.

* * * * *